(12) United States Patent
Lu et al.

(10) Patent No.: US 8,412,862 B2
(45) Date of Patent: Apr. 2, 2013

(54) DIRECT MEMORY ACCESS TRANSFER EFFICIENCY

(75) Inventors: Jizhu Lu, Newark, DE (US); Michael P. Perrone, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 12/337,703

(22) Filed: Dec. 18, 2008

(65) Prior Publication Data

US 2010/0161896 A1 Jun. 24, 2010

(51) Int. Cl.
*G06F 3/00* (2006.01)

(52) U.S. Cl. ......... 710/20; 710/1; 710/5; 710/7; 710/15; 710/22

(58) Field of Classification Search ................... 710/1, 5, 710/7, 15, 20, 22
See application file for complete search history.

(56) References Cited

U.S. PATENT DOCUMENTS

| | | | |
|---|---|---|---|
| 6,397,316 B2 | 5/2002 | Fesas, Jr. | |
| 6,484,251 B1* | 11/2002 | McDonald et al. | 712/23 |
| 6,681,273 B1* | 1/2004 | Allen et al. | 710/52 |
| 7,114,042 B2 | 9/2006 | Day et al. | |
| 7,177,982 B2 | 2/2007 | Barrick | |
| 7,716,458 B2* | 5/2010 | Saito et al. | 712/226 |
| 7,865,631 B2* | 1/2011 | Madruga et al. | 710/22 |
| 2003/0110329 A1* | 6/2003 | Higaki et al. | 710/36 |
| 2005/0025140 A1* | 2/2005 | Deforche et al. | 370/363 |
| 2006/0288151 A1* | 12/2006 | McKenney | 711/3 |
| 2007/0130438 A1 | 6/2007 | Marr et al. | |
| 2007/0240142 A1 | 10/2007 | Brokenshire et al. | |
| 2008/0183907 A1* | 7/2008 | Thudt | 710/11 |
| 2009/0052542 A1* | 2/2009 | Romanovskiy et al. | 375/240.24 |
| 2009/0157913 A1* | 6/2009 | Bellows | 710/22 |

FOREIGN PATENT DOCUMENTS

CN 101232450 A 7/2008

OTHER PUBLICATIONS

Jimenez-Gonzalez et al., "Performance Analysis of Cell Broadband Engine for High Memory Bandwidth Applications", IEEE, 2007, pp. 210-219.
Ohara et al., "MPI microtask for programming the Cell Broadband Engine processor", IBM Systems Journal, vol. 45, No. 1, 2006, pp. 85-102.

* cited by examiner

*Primary Examiner* — Chun-Kuan Lee
*Assistant Examiner* — Jasjit Vidwan
(74) *Attorney, Agent, or Firm* — Stephen R. Tkacs; Stephen J. Walder, Jr.; Matthew B. Talpis

(57) ABSTRACT

A mechanism is provided for improving the efficiency of multiple smaller direct memory access transfers. The mechanism uses one input buffer and a small result buffer, or some temporary variables, to temporarily store computation results. The mechanism performs a computation on a segment of data in the input buffer and stores the result in the temporary result buffer. The mechanism then copies the result back into the input buffer. As such, the mechanism uses the input buffer as both an input buffer and a results buffer. The mechanism then performs a direct memory access transfer on the segment of the input buffer that contains the computation result and then performs a computation on the next segment of the input buffer. The mechanism then repeats this process until the entire input buffer has been processed.

15 Claims, 9 Drawing Sheets

```
ibuf = 0;
  ftme = 1;
  ii = 0;
  jj = 0;
  abuf = tbuf0;
    for(j=0; j<rlen; j+=8)  {
    /* Real */
    wk1 = spu_shuffle(z[j], z[j+2],pshf01);
    wk2 = spu_shuffle(z[j+4],z[j+6],pshf01);
    wk3 = spu_shuffle(z[j], z[j+2],pshf02);
    wk4 = spu_shuffle(z[j+4],z[j+6],pshf02);
    abuf[jj]   = spu_shuffle(wk1,wk2,pshf03);
    abuf[jj+2] = spu_shuffle(wk1,wk2,pshf04);
    abuf[jj+4] = spu_shuffle(wk3,wk4,pshf03);
    abuf[jj+6] = spu_shuffle(wk3,wk4,pshf04);
    /* Imaginary */
    wk1 = spu_shuffle(z[j+1],z[j+3],pshf01);
    wk2 = spu_shuffle(z[j+5],z[j+7],pshf01);
    wk3 = spu_shuffle(z[j+1],z[j+3],pshf02);
    wk4 = spu_shuffle(z[j+5],z[j+7],pshf02);
    abuf[jj+1] = spu_shuffle(wk1,wk2,pshf03);
    abuf[jj+3] = spu_shuffle(wk1,wk2,pshf04);
    abuf[jj+5] = spu_shuffle(wk3,wk4,pshf03);
    abuf[jj+7] = spu_shuffle(wk3,wk4,pshf04);
    /* List PUT COLSEG column sections */
    ii++;
    if(ii == COLSEG) { // Time to put COLSEG column sections
    if(ftme){ // Don't wait first time, to overlap the PUT
       ftme = 0;
    } else {
       mfc_write_tag_mask(1<<26);
       mfc_read_tag_status_all();
    }
    dmalst[ii-1] = (unsigned int) curz2+coset+(128*(dbl-1))+(bsize*ibuf);
    /* Put COLSEG column slices */
    for(i=0; i<COLSEG; i++) {
       mfc_put(abuf+(8*i), dmalst[i], 128, 26, 0, 0);
    }i
    f(abuf == tbuf0) { // Swap buffers
       abuf = tbuf1;
    } else {
       abuf = tbuf0;
    }
    jj = 0;
```

*FIG. 5A*

```
      } else {
        mfc_write_tag_mask(1<<26);
        mfc_read_tag_status_all();
      }
      dmalst[ii-1] = (unsigned int) curz2+coset+(128*(dbl-1))+(bsize*ibuf);
      /* Put COLSEG column slices */
      for(i=0; i<COLSEG; i++) {
        mfc_put(abuf+(8*i), dmalst[i], 128, 26, 0, 0);
      }
      f(abuf == tbuf0) { // Swap buffers
        abuf = tbuf1;
      } else {
        abuf = tbuf0;
      }
      jj = 0;
      ii = 0;
    } else { // Build another list entry
      jj += 8;
      dmalst[ii-1] = (unsigned int) curz2+coset+(128*(dbl-1))+(bsize*ibuf);
    }
    buf++;
  } // End of loop through one vector array
    /* Wait on the last put in the loop (if any) */
    mfc_write_tag_mask(1<<26);
    mfc_read_tag_status_all();
  /* Put any remaining column sections */
  if(ii) {
      for(i=0; i<ii; i++) {
        mfc_put(abuf+(8*i), dmalst[i], 128, 26, 0, 0);
      }
      mfc_write_tag_mask(1<<26);
      mfc_read_tag_status_all();
}
```

*FIG. 5B*

```
ii = 0;
outdmaadr = (unsigned int) curz2+coset+128*(dbl-1);
for(j=0; j<rlen; j+=8) {
  /* Real */
  wk1 = spu_shuffle(z[j], z[j+2],pshf01);
  wk2 = spu_shuffle(z[j+4],z[j+6],pshf01);
  wk3 = spu_shuffle(z[j], z[j+2],pshf02);
  wk4 = spu_shuffle(z[j+4],z[j+6],pshf02);
  wk5 = spu_shuffle(z[j+1],z[j+3],pshf01);
  wk6 = spu_shuffle(z[j+5],z[j+7],pshf01);
  wk7 = spu_shuffle(z[j+1],z[j+3],pshf02);
  wk8 = spu_shuffle(z[j+5],z[j+7],pshf02);
  z[j]   = spu_shuffle(wk1,wk2,pshf03);
  z[j+1] = spu_shuffle(wk5,wk6,pshf03);
  z[j+2] = spu_shuffle(wk1,wk2,pshf04);
  z[j+3] = spu_shuffle(wk5,wk6,pshf04);
  z[j+4] = spu_shuffle(wk3,wk4,pshf03);
  z[j+5] = spu_shuffle(wk7,wk8,pshf03);
  z[j+6] = spu_shuffle(wk3,wk4,pshf04);
  z[j+7] = spu_shuffle(wk7,wk8,pshf04);
  /* List PUT COLSEG column sections */
  ii++;
  if(ii == COLSEG) { // Time to put COLSEG column sections
    dmalst[ii-1] = outdmaadr;

/* Put COLSEG column slices */
    for(i=0; i<COLSEG; i++){
      mfc_put(z+(8*i+j-56), dmalst[i], 128, 26, 0, 0);
    }
    ii = 0;
  } else { // Build another list entry
    dmalst[ii-1] = outdmaadr;
  }
  outdmaadr += bsize;
} // End of loop through one vector array /* Put any remaining column sections */
if (ii) {
  for (i=0; i<ii; i++) {
    mfc_put(z+(8*(i-ii)+j), dmalst[i], 128, 26, 0, 0);
  }
}
  } else { // Build another list entry
    dmalst[ii-1] = outdmaadr;
  }
  outdmaadr += bsize;
} // End of loop through one vector array /* Put any remaining column sections */
if (ii) {
  for (i=0; i<ii; i++) {
    mfc_put(z+(8*(i-ii)+j), dmalst[i], 128, 26, 0, 0);
  }
}
```

*FIG. 6*

| MATRIX SIZE | 3SW | NEW 3SW | 3SWO | NEW 3SWO | 2SW | NEW 2SW | 2SWO | NEW 2SWO |
|---|---|---|---|---|---|---|---|---|
| 364x240 | 6.63 | 6.18 | 4.74 | 4.42 | 5.56 | 5.46 | 5.31 | 5.22 |
| 616x308 | 11.86 | 11.14 | 8.21 | 7.58 | 9.5 | 9.29 | 9.05 | 8.91 |
| 840x462 | 24.3 | 22.87 | 16.96 | 15.73 | 18.71 | 18.26 | 17.83 | 17.34 |
| 1008x616 | 34.72 | 32.19 | 23.07 | 21.12 | 27.58 | 27.05 | 26.29 | 25.91 |
| 1260x840 | 59.71 | 55.58 | 39.94 | 36.62 | 50.84 | 50.06 | 48.38 | 47.16 |
| 1540x1008 | 86.16 | 80.26 | 57.65 | 52.86 | 79.1 | 77.44 | 75.66 | 73.68 |

*FIG. 7*

DIRECT MEMORY ACCESS TRANSFER EFFICIENCY

BACKGROUND

The present application relates generally to an improved data processing apparatus and method and more specifically to an apparatus and method to improve multiple smaller direct memory access transfer efficiency for programming on a Cell Broadband Engine™ processor.

The Cell Broadband Engine™ architecture combines a general-purpose Power Architecture® core of modest performance with streamlined co-processing elements that greatly accelerate multimedia and vector processing applications, for example. The co-processing elements, referred to as synergistic processing elements (SPEs) greatly accelerate many forms of dedicated computation. The Cell Broadband Engine™ (Cell/B.E.™) processor is a single chip multi-core architecture that provides low cost and high performance a wide range of applications from computer games to many compute-intensive applications in various application domains, such as seismic data processing, bioinformatics, graph processing, etc. CELL BROADBAND ENGINE and CELL/B.E. are trademarks of Sony Computer Entertainment, Inc., in the United States, other countries, or both. POWER ARCHITECTURE is a registered trademark of IBM Corporation in the United States, other countries, or both.

One feature provided by the Cell/B.E.™ architecture is the use of eight synergistic processing elements (SPEs), for example, each using its own local store (LS) rather than a cache. This requires Cell/B.E.™ programmers to explicitly use direct memory access (DMA) instructions to transfer data and/or results between the main shared memory and the local stores. This feature provides Cell/B.E.™ programmers with more flexibility, as well as more complexity.

Cell/B.E.™ programmers must then consider the efficiency of using the LSs, which greatly affects the actual performance of an application. How to efficiently use LSs is a very important issue a Cell/B.E.™ programmer should consider. Due to the limited space of each LS, it is common to perform frequent DMA transfers back and forth between main memory and the LS. Therefore, the strategy for performing DMA transfers may be critical to an application's performance.

One common technique currently used is called "double buffering." The basic idea of double buffering is to hide the DMA transfer latency by switching the computation between two buffers, thus performing DMA transfer on one of the buffers while performing computation on the other. For compute-bounded applications, this technique can effectively hide DMA transfer latency.

Nonetheless, there are many applications that are memory-bounded, and in those cases the performance of the application is not limited by the computing power of each SPE, but by the DMA transfer bandwidth. Thus, any time wasted on DMA transfers may negatively affect the application's performance. To get better performance and efficiency, a programmer may try to perform as few DMA transfers as possible with as large a transfer size as possible. However, due to the nature of many computing algorithms, one may not be able to avoid multiple smaller DMA transfers, making double buffering the only technique for improving performance.

SUMMARY

In one illustrative embodiment, a method, in a data processing system, is provided for improved direct memory access transfer. The method comprises performing a direct memory access transfer to load data from main memory to an input buffer, performing at least one computation on a first data segment within the input buffer to generate a first result data segment, storing the first result data segment back into the input buffer, and initiating a direct memory access transfer to store the first result data segment from the input buffer to the main memory.

In other illustrative embodiments, a computer program product comprising a computer useable or readable medium having a computer recordable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 5A and 5B show an example of code using direct memory access transfer using double buffering;

FIG. 6 shows an example of code using direct memory access transfer using temporary variables in accordance with an illustrative embodiment;

FIG. 7 is a table illustrating performance improvements for various matrix sizes and computations in accordance with the illustrative embodiments.

DETAILED DESCRIPTION

The illustrative embodiments provide a mechanism for improving the efficiency of multiple smaller direct memory access transfers. The mechanism may be applied to any applications where the double buffering technique is usually applied. The mechanism uses one input buffer and a small result buffer, or some temporary variables, to temporarily store computation results. The mechanism performs a computation on a segment of data in the input buffer and stores the result or intermediate result in the temporary result buffer or temporary variables. The mechanism then copies the result back into the input buffer or directly stores the result into the input buffer. As such, the mechanism uses the input buffer as both an input buffer and a results buffer.

The mechanism then performs a direct memory access transfer on the segment of the input buffer that contains the computation result and then performs a computation on the next segment of the input buffer. The mechanism then repeats this process until the entire input buffer has been processed. The mechanism does not perform a direct memory access status check during the computation and the direct memory access transfer process. The mechanism only checks whether the direct memory access transfers have finished when it needs to reuse the input buffer.

The mechanism performs extra copy operations within the local store; however, the overhead for a copy within the local store is less than checking the direct memory access transfer status and waiting for the direct memory access transfer to finish. In fact, the mechanism may not have to perform the extra copy, because for some complex computations, the mechanism may simply use the temporary buffer to store intermediate results and directly put the final results back into the input buffer instead of the temporary results buffer. Thus, the mechanism not only uses smaller local store space, which is limited, but also results in better performance.

Figure 1:
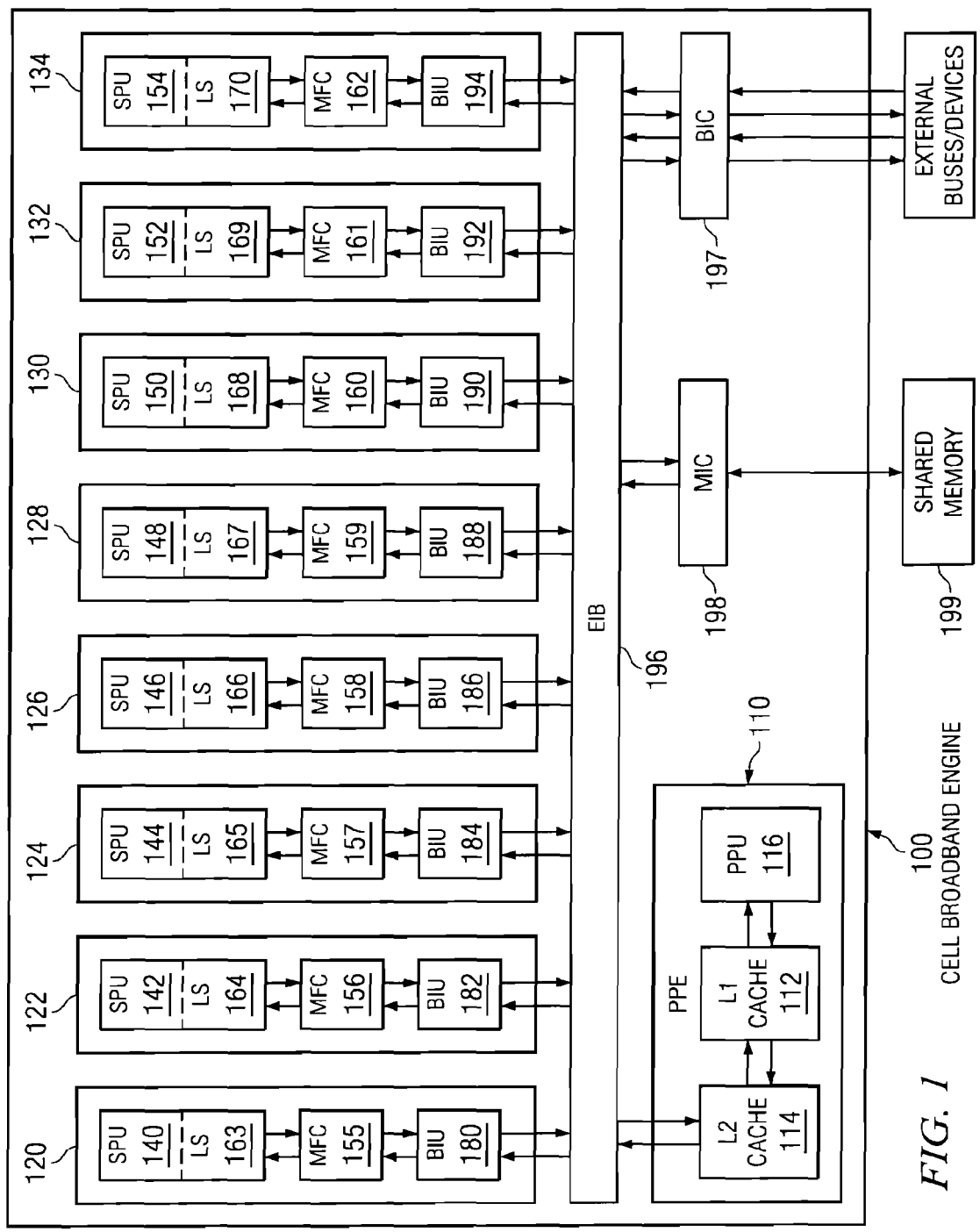
FIG. 1 is an exemplary block diagram of a data processing system in which aspects of the present invention may be implemented.

The illustrative embodiments may be utilized in many different types of data processing environments including a distributed data processing environment, a single data processing device, or the like. In order to provide a context for the description of the specific elements and functionality of the illustrative embodiments, FIG. 1 is provided hereafter as exemplary environments in which exemplary aspects of the illustrative embodiments may be implemented. While the description following FIG. 1 will focus primarily on a single data processing device implementation, this is only exemplary and is not intended to state or imply any limitation with regard to the features of the present invention. To the contrary, the illustrative embodiments are intended to include distributed data processing environments, grid computing environments, and so forth.

FIG. 1 is an exemplary block diagram of a data processing system in which aspects of the present invention may be implemented. The exemplary data processing system shown in FIG. 1 is an example of the Cell Broadband Engine™ (Cell/B.E.™) data processing system. While the Cell/B.E.™ processor will be used in the description of the preferred embodiments of the present invention, the present invention is not limited to such, as will be readily apparent to those of ordinary skill in the art upon reading the following description.

As shown in FIG. 1, the Cell/B.E.™ processor 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The local memory or local store (LS) 163-170 is a non-coherent addressable portion of a large memory map which, physically, may be provided as small memories coupled to the SPUs 140-154. The local stores 163-170 may be mapped to different address spaces. These address regions are continuous in a non-aliased configuration. A local store 163-170 is associated with its corresponding SPU 140-154 and SPE 120-134 by its address location, such as via the SPU Identification Register, described in greater detail hereafter. Any resource in the system has the ability to read/write from/to the local store 163-170 as long as the local store is not placed in a secure mode of operation, in which case only its associated SPU may access the local store 163-170 or a designated secured portion of the local store 163-170.

The Cell/B.E.™ processor 100 may be a system-on-a-chip such that each of the elements depicted in FIG. 1 may be provided on a single microprocessor chip. Moreover, the Cell/B.E.™ processor 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU execute vectorized instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the Cell/B.E.™ processor 100 and other external buses and devices.

The PPE 110 is a dual threaded PPE 110. The combination of this dual threaded PPE 110 and the eight SPEs 120-134 makes the Cell/B.E.™ 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE 120-134 gives a theoretical 32 GFlops of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

Figure 2:
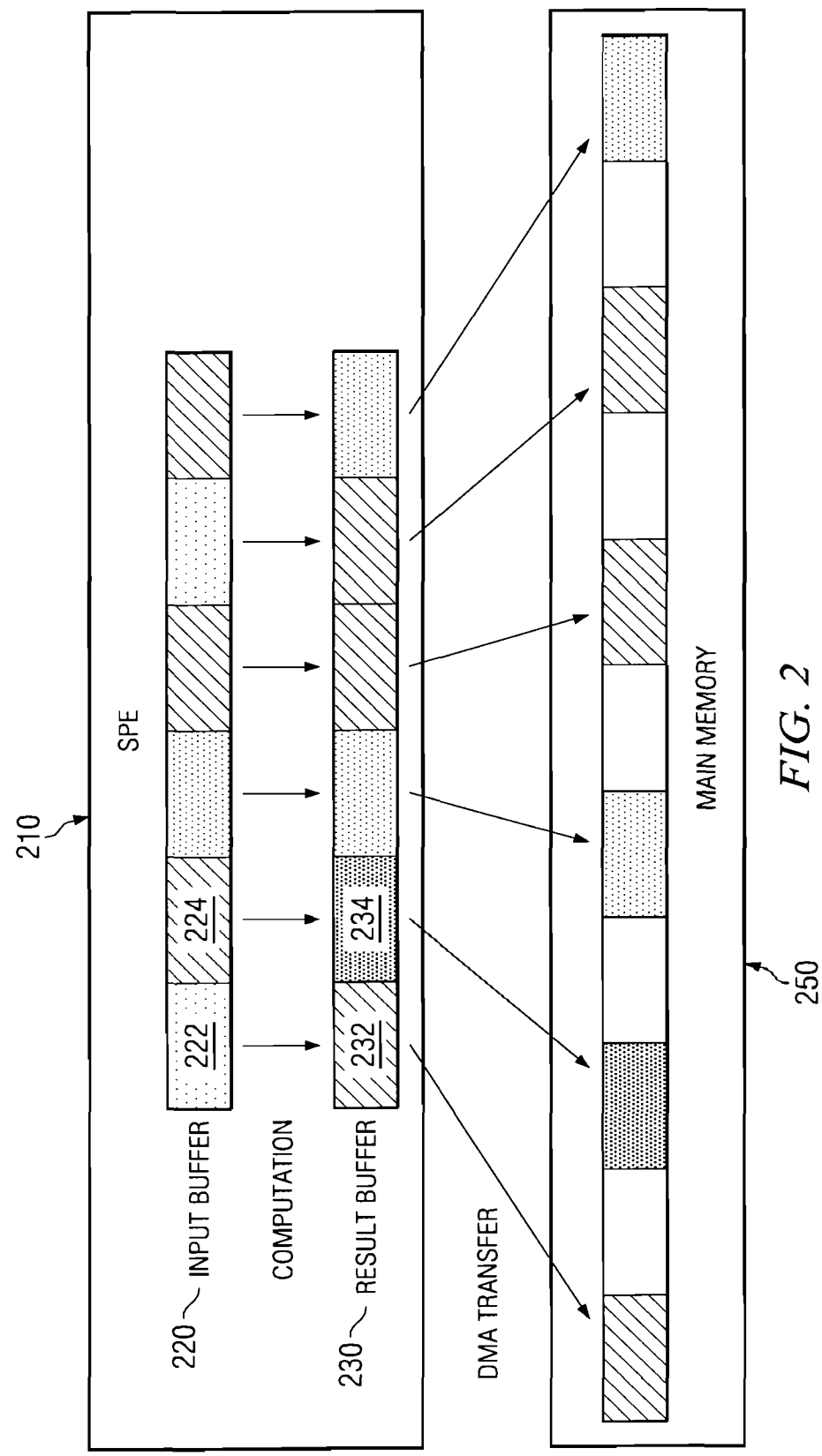
FIG. 2 depicts a direct memory access transfer technique.

FIG. 2 depicts a direct memory access transfer technique. Synergistic processing element (SPE) 210 performs a direct memory access (DMA) transfer to load data from main memory 250 to input buffer 220. SPE 210 then performs a computation on data segments in input buffer 220 and stores the results in result buffer 230. For example, SPE 210 performs a computation on data segment 222 to generate result data segment 232 and performs a computation on data segment 224 to generate result data segment 234. Input buffer 220 and result buffer 230 may be part of a local store associated with SPE 210. For example, SPE 210 may be one of SPEs 120-134, and input buffer 220 and result buffer 230 be comprised within one of local stores (LSs) 163-170 in FIG. 1.

In the example depicted in FIG. 2, SPE 210 then performs DMA transfers to store the results from result buffer 230 into main memory 250. SPE 210 may transfer the result data segments from result buffer 230 to different locations in main memory 250 in order to prepare the data for the next step's computation. Therefore, SPE 210 may perform multiple smaller DMA transfers or a single DMA operation using a DMA list which is composed of multiple smaller DMA transfers from result buffer 230 to main memory 250. In either case, it will use a relatively larger result buffer.

Cell/B.E.™ programmers must consider the efficiency of using the LSs, which greatly affects the actual performance of an application. How to efficiently use LSs is a very important issue a Cell/B.E.™ programmer should consider. Due to the limited space of each LS, it is common to perform frequent DMA transfers back and forth between main memory and the LS. Therefore, the strategy for performing DMA transfers may be critical to an application's performance.

One common technique currently used is called "double buffering." The basic idea of double buffering is to hide the DMA transfer latency by switching the computation between two buffers, thus performing DMA transfer on one of the buffers while performing computation on the other. For compute-bounded applications, this technique can effectively hide DMA transfer latency.

Figure 3:
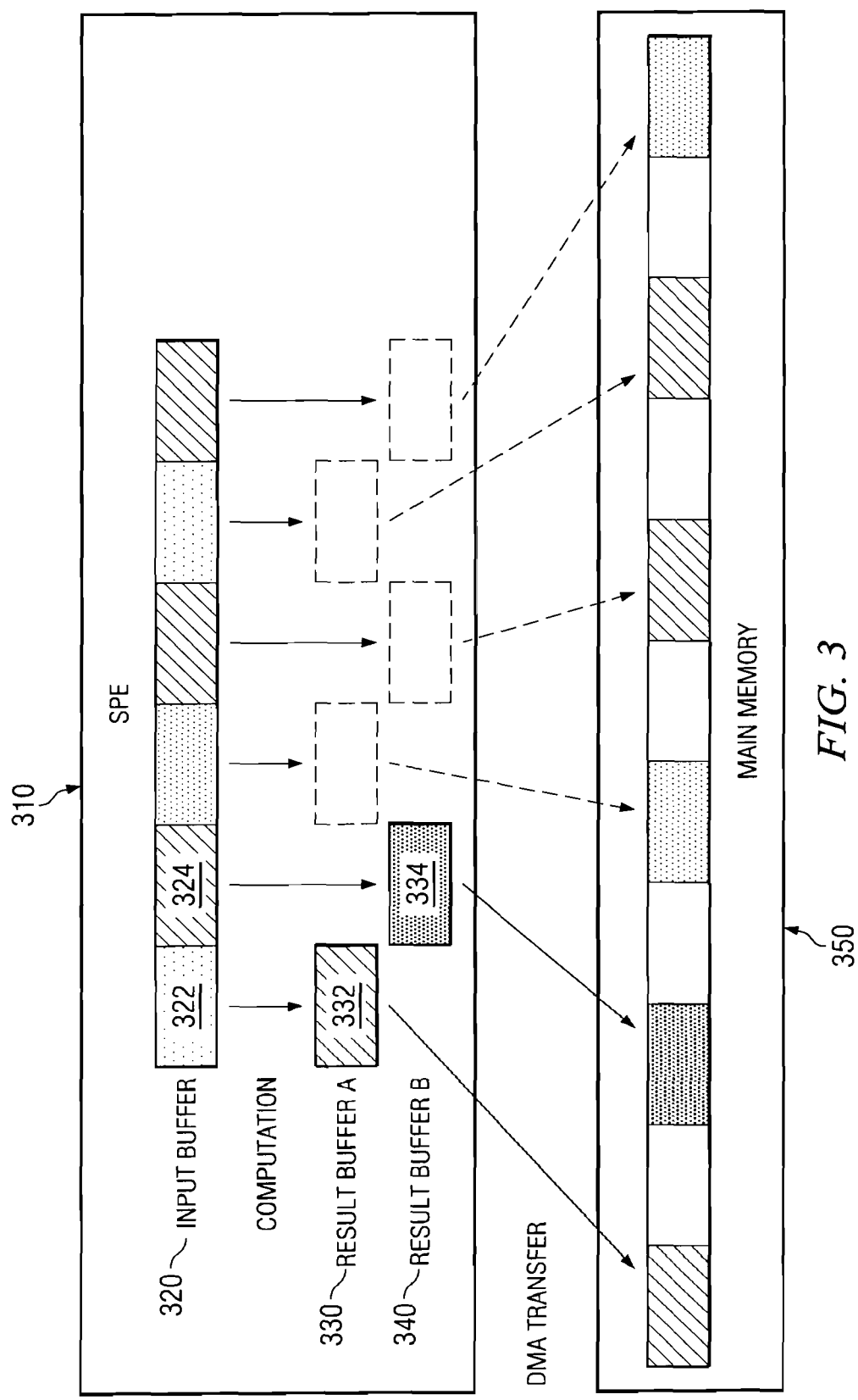
FIG. 3 depicts a direct memory access transfer technique using double buffering.

FIG. 3 depicts a direct memory access transfer technique using double buffering. SPE 310 performs a DMA transfer to load data from main memory 350 to input buffer 320. SPE 310 then performs a computation on data segments in input buffer 320. In the depicted example, SPE 310 alternates between storing the results into result buffer A 330 and result buffer B 340. For example, SPE 310 performs a computation on data segment 322 to generate result data segment 332 in result buffer A 330 and performs a computation on data segment 324 to generate result data segment 344 in result buffer B 340.

In the example depicted in FIG. 3, SPE 310 then performs a DMA transfers to store the results from result buffer A 330 and result buffer B 340 into main memory 350. SPE 310 may transfer the result data segments from result buffer A 330 and result buffer B 340 to different locations in main memory 350 in order to prepare the data for the next step's computation. SPE 310 alternates between result buffer A 330 and result buffer B 340, performing a computation on a data segment and storing the result in one result buffer while performing a DMA transfer to store a result data segment from the other result buffer. For example, SPE 310 may perform a computation on data segment 324 and store result data segment 344 into result buffer B 340 while performing a DMA transfer of result data segment 332 from result buffer A 330 to main memory 350. Then, SPE 310 may perform the next computation on the next data segment and store the result in result buffer A while performing a DMA transfer to store result data segment 344 from result buffer B 340 to main memory 350. Therefore, SPE 310 may perform multiple smaller DMA transfers from result buffer A 330 and result buffer B 340 to main memory 350.

There are many applications that are memory-bounded, and in those cases the performance of the application is not limited by the computing power of each SPE, but by the DMA transfer bandwidth. Furthermore, a drawback of double buffering is that the SPE must check the status of DMA transfers and reuse the buffer only when the DMA transfer has finished. This introduces extra overhead for synchronization. Thus, in accordance with an illustrative embodiment, a mechanism is provided for improving the efficiency of multiple smaller direct memory access transfers. The mechanism may be applied to any applications the double buffering technique is usually applied.

Figure 4:
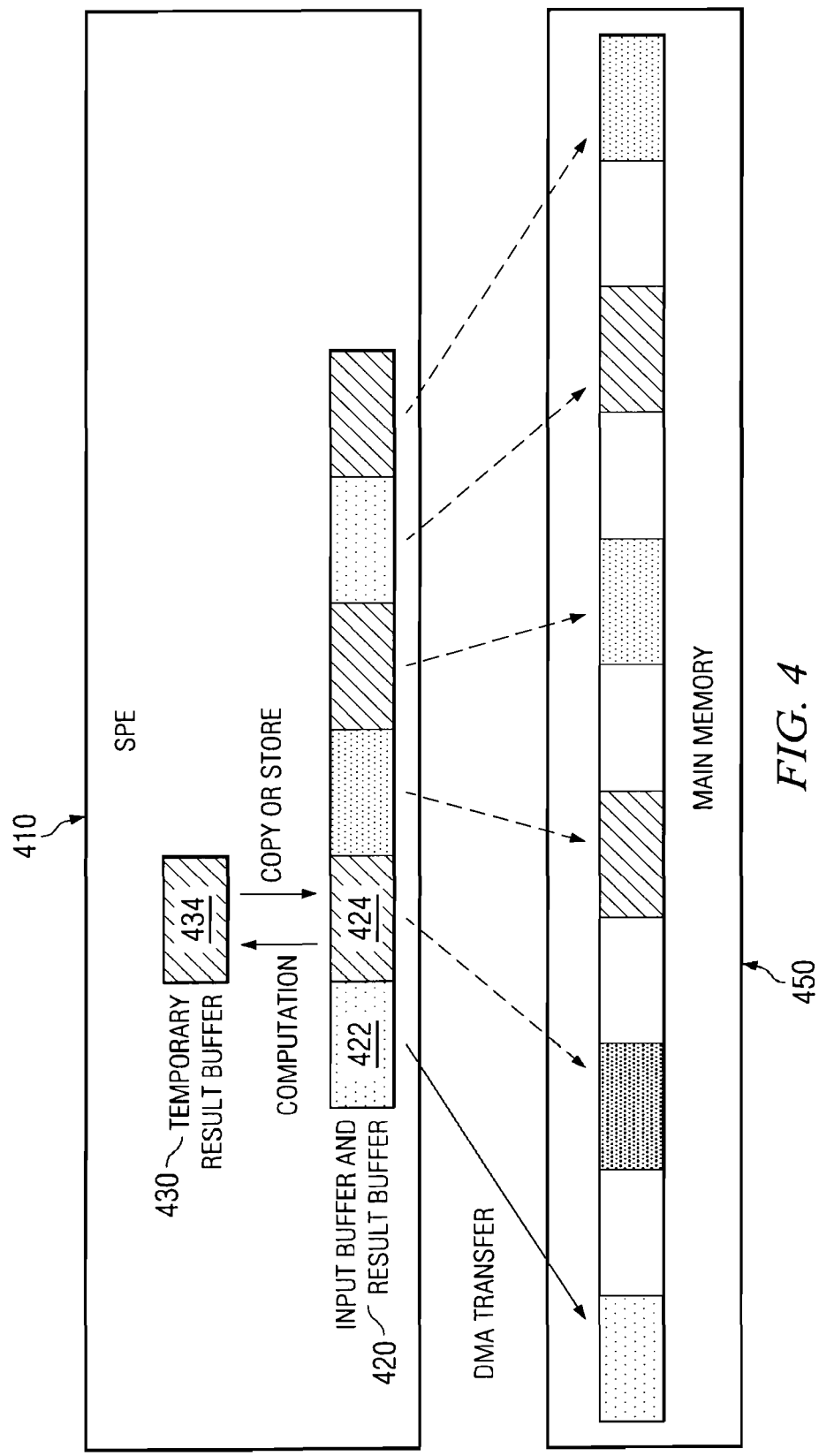
FIG. 4 depicts a direct memory access transfer technique using a temporary result buffer in accordance with an illustrative embodiment.

FIG. 4 depicts a direct memory access transfer technique using a temporary result buffer in accordance with an illustrative embodiment. SPE 410 includes an input and result buffer 420 and a temporary result buffer 430. SPE 410 performs a DMA transfer to load data from main memory 450 to input buffer 420. SPE 410 then performs a computation on data segments in input buffer 420. In the depicted example, SPE 410 performs a computation on data segment 424 and temporarily stores the results or intermediate results into the result data segment 434 in temporary result buffer 430. Temporary result buffer 430 may be a small portion of the local store or one or more registers in SPE 410. SPE 410 then copies the result data segment 434 from temporary result buffer 430 back to input and result buffer 420 or performs another computation on the data segment 434 containing intermediate results and put the results into input and result buffer 420.

In the example depicted in FIG. 4, SPE 410 then performs a DMA transfers to store the results from input and result buffer 420 into main memory 450. SPE 410 may transfer the result data segments from input and result buffer 420 to different locations in main memory 450 due to the nature of the algorithm implemented or in order to prepare the data for the next step's computation. SPE 410 may perform a computation on one data segment, such as data segment 424, and store the result back into the input and result buffer 420 while performing a DMA transfer to store a previous result data segment, such as data segment 422, from input and result buffer 420 to main memory 450. Therefore, SPE 410 may perform multiple smaller DMA transfers from input and result buffer 420 to main memory 450.

SPE 410 then repeats this process until the entire input buffer has been processed. SPE 410 does not perform a direct memory access status check during the computation and the direct memory access transfer process. SPE 410 only checks whether the direct memory access transfers have finished when it needs to reuse input and result buffer 420. SPE 410 performs extra copy operations within the local store; however, the overhead for a copy within the local store is less than checking the direct memory access transfer status and waiting for the direct memory access transfer to finish. In fact, SPE 410 may not have to perform the extra copy, because for some complex computations, SPE 410 may simply put the results back into the input buffer instead of the temporary results buffer. Thus, the DMA transfer using a temporary result buffer, as depicted in FIG. 4, not only uses smaller local store space, which is limited, but also results in better performance.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIGS. 5A and 5B show an example of code using direct memory access transfer using double buffering. The code shown in FIGS. 5A and 5B illustrate a parallelized prime factor analysis fast Fourier transform (PFAFFT) for the Cell/B.E.™ architecture. FIG. 6 shows an example of code using direct memory access transfer using temporary variables in accordance with an illustrative embodiment. The code shown in FIG. 6 performs the same parallelized PFAFFT function for the Cell/B.E.™ architecture, although the code in FIG. 6 is not only more efficient, but also shorter and simpler. The longer the input buffer and the higher the number of small DMA transfers, the larger the performance improvements.

FIG. 7 is a table illustrating performance improvements for various matrix sizes and computations in accordance with the illustrative embodiments. For each matrix size and computation, the table shown in FIG. 7 compares a time for the computation using double buffering and a corresponding "new" time, where the "new" time uses the input/result buffer and temporary result buffer as illustrated in FIG. 4, for example.

There are two implementations of PFAFFT on the Cell/B.E.™ data processing system using two different strategies: one is "3-step PFAFFT" and the other is "2-step PFAFFT." And, there are also two cases of applying PFAFFT: one is with the input data in vectorized format and the other is with the input data in non-vectorized format. For the latter case, PFAFFT needs to convert the input data from non-vectorized format to vectorized format, then do FFT computation and after FFT computation needs to convert the output data from vectorized format to non-vectorized format. "3SW" stands for 3-step PFAFFT with vectorized input data. "3SWO" stands for 3-step PFAFFT without vectorized input data. "2SW" stands for 2-step PFAFFT with vectorized input data and similarly "2SWO" stands for 2-step PFAFFT without vectorized input data.

Figure 8:
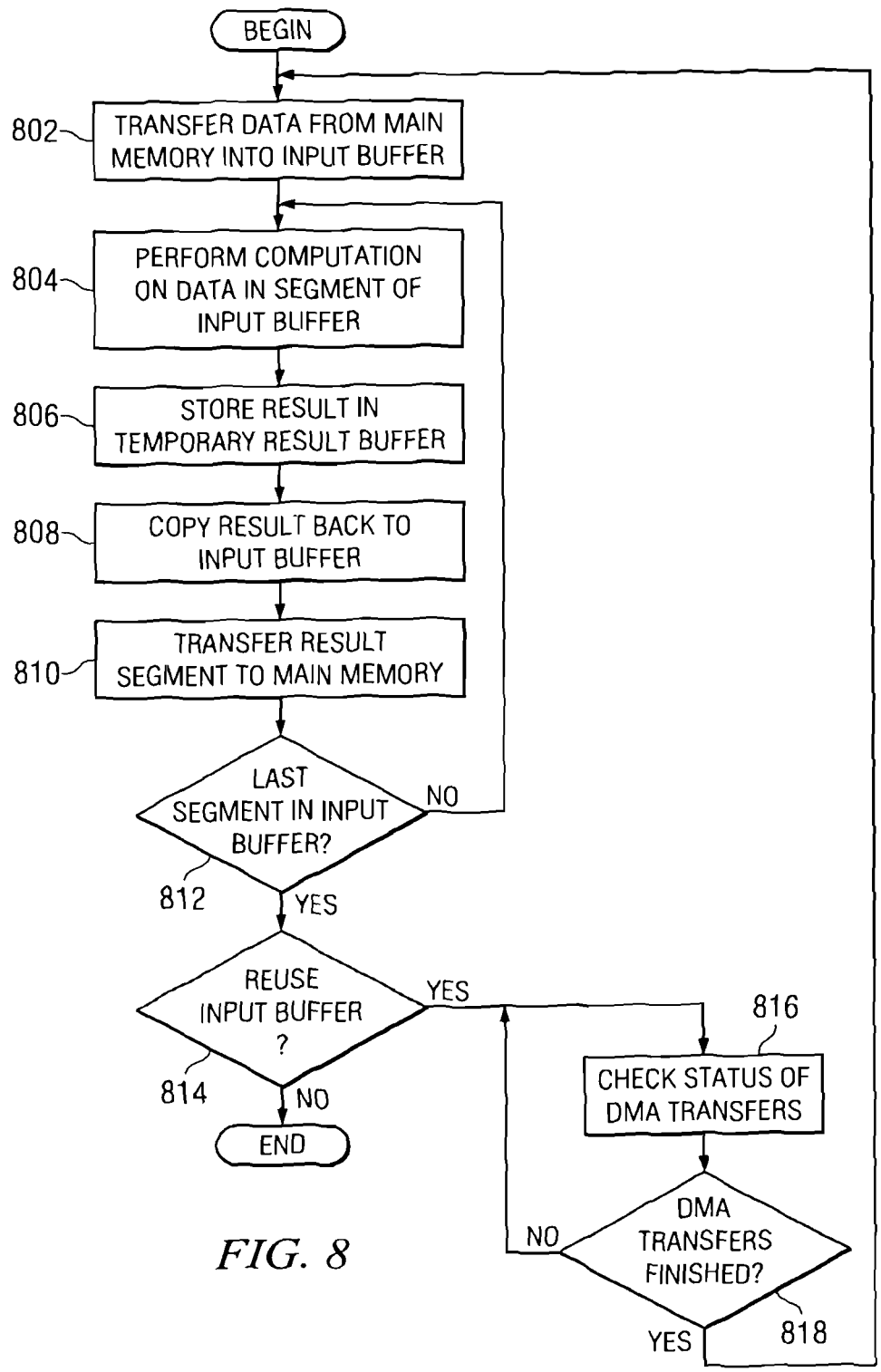
FIG. 8 is a flowchart illustrating operation of a direct memory access transfer with a temporary result buffer in accordance with an illustrative embodiment.

FIG. 8 is a flowchart illustrating operation of a direct memory access mechanism using a temporary result buffer in accordance with an illustrative embodiment. Operation begins, and the mechanism performs a direct memory access (DMA) transfer to load data from main memory into an input buffer (block 802). The mechanism then performs a computation on a segment of data in the input buffer (block 804) and stores the result in a temporary result buffer (block 806). Then, the mechanism copies the result back to the input buffer (block 808). Thus, the mechanism uses the input buffer as both an input and a result buffer. In an alternative embodiment, or when the computation allows, the mechanism may store the result directly back into the input/result buffer without using the temporary result buffer.

Next, the mechanism transfers the result segment to main memory (block 810). The mechanism determines whether the data segment being transferred is the last segment in the input buffer (block 812). If the segment is not the last segment, operation returns to block 804 to perform a computation on the next data segment. The transfer in block 810 is a DMA transfer. Thus, while the DMA transfer in block 810 is being performed, the mechanism may concurrently perform the next computation. Only for the last computation must the mechanism check the status of the DMA transfers back to main memory.

If the segment is the last segment in the input buffer in block 812, the mechanism determines whether it needs to reuse the input buffer (block 814). If the mechanism does not need to reuse the input buffer, operation ends. If the mechanism determines that it needs to reuse the input buffer in block 814, the mechanism checks the status of the DMA transfers (block 816) and determines whether all of the DMA transfers from the input/result buffer to main memory have finished (block 818). If all of the DMA transfers have finished, operation returns to block 802 to perform a next DMA transfer from main memory to the input buffer. Otherwise, operation returns to block 816 to check the status of the DMA transfers.

Thus, the illustrative embodiments provide mechanisms for improving the efficiency of multiple smaller direct memory access transfers. The mechanism may be applied to any applications the double buffering technique is usually applied. The mechanism uses one input buffer and a small result buffer, or some temporary variables, to temporarily store computation results. The mechanism performs a computation on a segment of data in the input buffer and stores the result in the temporary result buffer. The mechanism then copies the result back into the input buffer. As such, the mechanism uses the input buffer as both an input buffer and a results buffer.

The mechanism then performs a direct memory access transfer on the segment of the input buffer that contains the computation result and then performs a computation on the next segment of the input buffer (the computation and the direct memory access transfer will be performed simultaneously). The mechanism then repeats this process until the entire input buffer has been processed. The mechanism does not perform a direct memory access status check during the computation and the direct memory access transfer process. The mechanism only checks whether the direct memory access transfers have finished when it needs to reuse the input buffer. The mechanism performs extra copy operations within the local store; however, the overhead for a copy within the local store is less than checking the direct memory access transfer status and waiting for the direct memory access transfer to finish.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for improved direct memory access transfer, the method comprising:

performing a direct memory access transfer to load data from main memory to an input buffer in a local store associated with a processing element;

performing, by the processing element, at least one computation on a first data segment at a first location in the input buffer to generate a first result data segment;

storing, by the processing element, the first result data segment back to the first location of the input buffer;

initiating a direct memory access transfer to store the first result data segment from the input buffer to the main memory;

performing at least one computation on a current data segment, concurrently with a direct memory access transfer to store a previous result data segment from the input buffer to the main memory, to generate a current result data segment;

storing the current result data segment back into the input buffer;

initiating a direct memory access transfer to store the current result data segment from the input buffer to the main memory; and responsive to the current data segment being a last data segment in the input buffer, determining whether to reuse the input buffer.

2. The method of claim 1, wherein storing the first result data segment back to the first location of the input buffer comprises:
   storing the first result data segment in a temporary result buffer; and
   copying the first result data segment from the temporary result buffer to the first location of the input buffer.

3. The method of claim 2, wherein the temporary result buffer and the input buffer are stored in the local store associated with the processing element and wherein the processing element is a synergistic processing element.

4. The method of claim 2, wherein the temporary result buffer comprises one or more registers.

5. The method of claim 1, further comprising:
   responsive to a determination to reuse the input butter, checking a status of direct memory access transfers to store previous result data segments; and
   responsive to all direct memory access transfers to store previous result data segments being finished, performing a direct memory access transfer to load subsequent data from main memory to the input buffer.

6. A computer program product comprising a computer recordable medium having a computer readable program recorded thereon, wherein the computer readable program, when executed on a computing device, causes the computing device to:
   perform a direct memory access transfer to load data from main memory to an input buffer in a local store associated with a processing element;
   perform, by the processing element, at least one computation on a first data segment at a first location in the input buffer to generate a first result data segment;
   store, by the processing element, the first result data segment back to the first location of the input buffer;
   initiate a direct memory access transfer to store the first result data segment from the input buffer to the main memory;
   perform at least one computation on a current data segment, concurrently with a direct memory access transfer to store a previous result data segment from the input buffer to the main memory, to generate a current result data segment;
   store the current result data segment back into the input buffer;
   initiate a direct memory access transfer to store the current result data segment from the input buffer to the main memory; and
   responsive to the current data segment being a last data segment in the input buffer, determine whether to reuse the input buffer.

7. The computer program product of claim 6, wherein storing the first result data segment back to the first location of the input buffer comprises:
   storing the first result data segment in a temporary result buffer; and
   copying the first result data segment from the temporary result buffer to the first location of the input buffer.

8. The computer program product of claim 7, wherein the temporary result buffer and the input buffer are stored in the local store associated with the processing element and wherein the processing element is a synergistic processing element.

9. The computer program product of claim 7, wherein the temporary result buffer comprises one or more registers.

10. The computer program product of claim 6, wherein the computer readable program further causes the computing device to:
    responsive to a determination to reuse the input buffer, cheek a status of direct memory access transfers to store previous result data segments; and
    responsive to ail direct memory access transfers to store previous result data segments being finished, perform a direct memory access transfer to load subsequent data from main memory to the input buffer.

11. An apparatus, comprising:
    a processing element;
    a local store associated with the processing element; and
    a memory coupled to processing element,
    wherein the processing element performs a direct memory access transfer to load data from main memory to an input buffer in the local store associated with the processing element;
    wherein the processing element performs at least one computation on a first data segment at a first location in the input buffer to generate a first result data segment;
    wherein the processing element stores the first result data segment back to the first location of the input buffer;
    wherein the processing element initiates a direct memory access transfer to store the first result data segment from the input butter to the main memory;
    perform at least one computation on a current data segment, concurrently with a direct memory access transfer to store a previous result data segment from the input buffer to the main memory, to generate a current result data segment;
    store the current result data segment back into the input butter;
    initiate a direct memory access transfer to store the current result data segment from the input buffer to the main memory; and
    responsive to the current data segment being a last data segment in the input buffer, determine whether to reuse the input butter.

12. The apparatus of claim 11, wherein storing the first result data segment back to the first location of the input buffer comprises:
    storing the first result data segment in a temporary result buffer; and
    copying the first result data segment from the temporary result butter to the first location of the input butter.

13. The apparatus of claim 12, wherein the temporary result buffer and the input buffer are stored in the local store associated with the processing element and wherein the processing element is a synergistic processing element.

14. The apparatus of claim 12, wherein the temporary result buffer comprises one or more registers.

15. The apparatus of claim 11, wherein the instructions further cause the processor to:
    responsive to a determination to reuse the input buffer, cheek a status of direct memory access transfers to store previous result data segments; and
    responsive to all direct memory access transfers to store previous result data segments being finished, perform a direct memory access transfer to load subsequent data from main memory to the input buffer.

* * * * *